United States Patent [19]

Curry et al.

[11] Patent Number: 4,661,394
[45] Date of Patent: Apr. 28, 1987

[54] LOW GLARE POLYCARBONATE SHEET WITH IMPROVED OPTICAL PROPERTIES

[75] Inventors: Herbert L. Curry, Mt. Vernon; Ernest E. Roberts, Wadesville, both of Ind.

[73] Assignee: General Electric Company, Pittsfield, Mass.

[21] Appl. No.: 696,672

[22] Filed: Jan. 30, 1985

[51] Int. Cl.4 .............................................. B32B 27/36
[52] U.S. Cl. .................................... 428/212; 428/412; 428/522; 428/413; 428/520; 428/419; 428/911
[58] Field of Search ........................ 428/412, 522, 212

[56] References Cited

U.S. PATENT DOCUMENTS

| | | | |
|---|---|---|---|
| 3,582,389 | 6/1971 | Ringler | 117/33.3 |
| 4,396,678 | 8/1983 | Olson | 428/412 |
| 4,410,595 | 10/1983 | Matsumoto et al. | 428/412 |

*Primary Examiner*—P. C. Ives
*Attorney, Agent, or Firm*—Richard J. Traverso; William F. Mufatti; Edward K. Welch, II

[57] ABSTRACT

This disclosure describes transparent, low glare, thermoplastic sheet having improved weatherability and reduced distortion levels comprising a textured thermoplastic substrate and a methacrylic coating.

1 Claim, No Drawings

LOW GLARE POLYCARBONATE SHEET WITH IMPROVED OPTICAL PROPERTIES

This invention relates to low glare transparent thermoplastic protective sheet and to a method for making the same. More particularly, this invention relates to transparent thermoplastic sheet, preferably polycarbonate sheet, having a methyl methacrylic coating on at least one textured surface.

BACKGROUND OF THE INVENTION

Transparent thermoplastic sheet, especially polycarbonate sheet, is used in a wide number of applications requiring impact strength and transparency. A number of these applications utilize the impact strength of transparent thermoplastic sheet to render an object both available for view yet protected from tampering or theft and the like. Such applications include picture frames, display windows, protective covers for stained glass, and the like. These applications have in common a need to clearly view the object being protected while rendering the object inaccessible to the viewer. However, it has long been a problem that transparent thermoplastic sheet reflects a substantial portion of the light incident on its surface and thus has a problem with glare. In many situations, especially outdoor situations, the glare caused by such reflection renders the protected object unviewable.

U.S. Pat. Nos. 4,399,192 and 4,407,855, Russell, disclose a radiation curable polyfunctional acrylate composition for use as a mar resistant coating for inter alia polycarbonate substrates. Flatting agents may be added to the coating composition and a polycarbonate sheet coated with such is recommended for use as a low reflection filter for cathode ray tubes.

It is known that transparent thermoplastic sheet or film may be textured on one surface and coated with an acrylic protective coat to provide a transparent low glare thermoplastic sheet. However, such sheet as made in the past has had insufficient weatherability and, in part, due to an inability to protect finer textures from weathering, it has distorted objects viewed through it unless positioned within about 1" or less of the same.

Thus, problems in the past with transparent low glare thermoplastic sheet have been two-fold. Such sheet has had an insufficient level of weatherability and has tended to excessively distort objects viewed through it.

Therefore, it is an object of the present invention to produce a transparent low glare thermoplastic sheet having improved weatherability.

It is another object of the present invention to produce a transparent low glare thermoplastic sheet with reduced levels of distortion for objects viewed through it.

It is yet another object of the present invention to produce a transparent low glare sheet with a texture on at least one surface equivalent to that imprinted by a 10 microinch RMS roller and which textured surface has increased resistance to being obscured or destroyed by the effects of weathering.

DETAILED DESCRIPTION OF THE INVENTION

Briefly, according to the present invention, there is provided transparent low glare, thermoplastic sheet comprising:

(a) a transparent thermoplastic sheet textured on at least one surface to scatter incident light; and,
(b) adhered to at least the textured surface of said sheet a protective coating produced from a methyl methacrylic material having a tensile elongation at break (23° C., 50% RH) of greater than about 3.5% and a glass transition temperature of greater than about 87° C.

Suitable thermoplastics for use in the sheet of the present invention include: acrylic and methacrylic polymers or copolymers; acetal homopolymers; acetal copolymers produced by polymerization of trioxane and ethylene oxide; epoxy resins; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and necessary compatabilizers.

The preferred thermoplastic sheet for use herein is a polycarbonate sheet. Suitable polycarbonates may be prepared by reacting a dihydric phenol with a carbonate precursor, such as phosgene, haloformate or a carbonate ester. Typically, they will have recurring structural units of the formula:

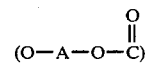

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4'-dihydroxy-diphenyl ether, bis(2-hydroxyphenyl)methane, mixtures thereof and the like. The preferred aromatic carbonate polymer for use herein is a homopolymer derived from 2,2-bis(4-hydroxyphenyl)propane, i.e., bisphenol-A.

The thermoplastic sheet is textured on one side to scatter incident light and break up reflected images. In one method for manufacturing such textured sheet, a thermoplastic material is extruded by common methods and is brought immediately into contact with a ground steel roll. The finish of the roll will imprint on the thermoplastic sheet and control the texture thereof. In the present invention, the preferred texture on the surface of the thermoplastic sheet corresponds to that imprinted by a steel roll having from about a 5 to about a 65 microinch RMS finish as measured by a SURFANALYZER recorder manufactured by Gould Inc, Cleveland, Ohio, according to the American Standard, ASA B46.1-1962. At such fine roll textures the temperature of the thermoplastic sheet in contact with the roll is critical to retaining the texture imprinted thereon. Of course, the critical temperature range of such texture retention on the sheet will vary according to the thermoplastic material being texturized. In the case of polycarbonate sheet, the temperature of texturizing for fine roll textures should be between about 125° C. and about 145° C.

Such fine textures are susceptible to being destroyed or obscured by the effects of weathering. Thus, coatings providing improved protection make possible the retention of fine texturing as the dominant surface characteristic over an increased portion of the useful structural life-time of the composite.

The protective coating of the present invention is a methyl methacrylic thermoplastic random copolymer with methacrylic modifying units of ethyl methacrylate, n-butyl methacrylate, i-butyl methacrylate, or mixtures thereof and optionally, modifying units of other alpha-beta ethylenically unsaturated compounds. The modifying units must be combined with the methyl methacrylate units in the random copolymer in such ratio as to result in a thermoplastic material having a tensile elongation at break (23° C., 50% RH) of greater than about 3.5 percent and a glass transition temperature of greater than about 87° C.

Persons skilled in the art of methacrylic polymer chemistry may determine the proper makeup and molecular weight of the random methyl methacrylic copolymer to achieve the required physical properties. However, to retain the methyl methacrylic character of the finished protective coat, no more than about ½ percent to about 10 percent by number of the mers of the copolymer chain may be derived from methacrylic modifying units of ethyl methacrylate, n-butyl methacrylate, i-butyl methacrylate, or mixtures thereof and optionally, no more than 5 percent by number of the mers of the copolymer chain may be from modifying units of other alpha-beta ethylenically unsaturated modifying units so long as they do not radically alter the properties of the copolymer. Suitable alpha-beta ethylenically unsaturated modifying units may be derived from, for example, acrylic acid, methacrylic acid, alkyl esters of acrylic and methacrylic acids (the alkyl group having 1 to 4 carbon atoms), acrylonitrile, methacrylonitrile, styrene and its derivatives, ethene, propene, etc. Preferably, the methacrylic modifying unit is derived from ethyl methacrylate and the other ethylenically unsaturated modifying unit is derived from ethylene.

Suitable protective coatings of the present invention may be derived from commercial methyl methacrylic materials or blends of commercial methyl methacrylic materials presently on the market. Such commercial methyl methacrylic materials usually require the addition of suitable solvents according to the method chosen for application to the substrate and drying. A particular commercial methyl methacrylic material suitable for use herein is sold as ELVACITE ™ bead polymer Grade 2021 by DuPont E. I. de Nemours and Company. This "ELVACITE 2021" has a specific gravity 25°/25° C., of 1.2, a glass transition temperature of 100° C., tensile strength (23° C., 50 percent RH) of 15,000 psi (106 MPa), and elongation at break (23° C., 50 percent RH) of 4%.

The protective coating of the present invention should be applied to at least the textured surface of the thermoplastic sheet by use of a suitable organic solvent system. Generally, it is best to adapt the solvent system according to the method of application to optimally balance the evaporation rate of the solvent in a drying step against the aggressiveness of the solvent on the substrate. Although persons skilled in the art can readily imagine organic solvents suitable for use herein, suggested solvents are hydroxy ethers, aliphatic alcohols, and ketones.

Suitable hydroxy ethers may be represented by the general formula:

$$R^1—O—R^2—OH$$

wherein $R^1$ is an alkyl radical or hydroxy substituted alkyl radical and $R^2$ is an alkylidene radical and preferably, the sum of the carbon atoms present in $R^1$ and $R^2$ is from 3 to about 10. Specifically, suitably hydroxy ethers are ethylene glycol monoethyl ether, propylene glycol monoethyl ether, ethylene glycol monobutyl ether, etc. Suitable aliphatic alcohols contain from 1 to 4 carbon atoms and include methanol, ethanol, isopropanol, t-butanol, isobutyl alcohol and the like. Suitable ketones may be represented by the general formula:

$$R^3-\overset{\overset{\displaystyle O}{\|}}{C}-R^4$$

wherein $R^3$ and $R^4$ are alkyl radicals or hydroxy substituted alkyl radicals the preferred sum of the carbon atoms of which varies about 2 to about 10. Specifically, suitable ketones are, for example, methyl ethyl ketone, acetone, 4-hydroxy-2-keto-4-methylpentane (diacetone alcohol), etc. Of course, these organic solvents may be blended with each other or with other organic solvents to arrive at a proper solvent system.

Solvent system is added to the methyl methacrylic polymer for the purpose of applying the protective coat to the substrate in an amount sufficient to dissolve the polymer but not in such an amount that an undue burden is placed on the drying equipment to dry and produce the protective coat. The optimum ratio of solvent to methyl methacrylic polymer changes according to the method of application used, the constituents of the solvent system, and the desired viscosity. Generally, the weight ratio of solvent system to methyl methacrylic polymer will vary from about 99/1 to about ¼.

Ultraviolet light absorbing compounds must be present in an amount effective to protect the thermoplastic substrate particularly polycarbonate substrate from the degradative effects of ultraviolet light. Ultraviolet light absorbing compounds preferred for use in the present invention, are those with a high affinity for the substrate as opposed to the methacrylic protective coating. Thus, UV light absorbing compounds impregnated into the substrate before the protective coating step should have a low tendency to migrate into adjoining layers or bloom, and UV light absorbing agents applied through surface impregnation simultaneous to the application of the protective coating should have a high tendency to migrate into the substrate and out of the protective coating layer. Some non-limiting examples of UV light absorbing compounds suitable for use herein, especially for surface impregnation of polycarbonate substrates, are benzophenone derivatives such as 2,2'-dihydroxybenzophenone, 2,2'-dihydroxy-4,4'-dimethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and diphenylcyanoacrylates such as ethyl-2-cyano-3,3-diphenylacrylate, 2-ethylhexyl-2-cyano-3,3-diphenylacrylate, lower aliphatic substituted diphenyls thereof, lower aliphatic substituted esters thereof, and the like.

The UV light absorber, for application by surface impregnation, is added to the methacrylic polymer/solvent system composition in amounts effective to protect the substrate. However, the amount of UV light absorbing compound added becomes excessive when the drying conditions of the protective coating are not effective to complete migration of the UV light absorbing compound out of the protective coatings or the substrate is unable to absorb the entire amount of UV light absorbing compound.

The methyl methacrylic polymer/solvent system compositions of the instant invention may also optionally contain various flatting agents, surface-active agents, stabilizers such as antioxidants, and thixotropic agents. All of these additives and the use thereof are well known in the art and do not require extensive discussion. Any compound possessing the ability to function in such a manner, i.e., as a flatting agent, surface-active agent, and stabilizer, can be used provided they do not adversely effect the required physical properties of the protective coating or adhesion.

The methyl methacrylic polymer/solvent system composition may be applied to the thermoplastic substrate by any of the well known methods such as spraying, dipping, roll-coating, flow coating, and the like. Usually, the composition is applied in an amount sufficient to provide a dried protective coating having a thickness of from about 0.01 to about 1.0 mil. As stated above, the optimum solvent system may change according to the method of application chosen with, for example, less viscous solvent systems being used for spray coating and solvent systems of higher viscosity being used for dip coating.

The solvent system is evaporated with air drying and heating to leave an even and uniform protective layer of methyl methacrylic polymer. Generally, it is desirable that the drying time of the methacrylic coating be as short as possible and thus the temperature of the drying step should be as great as practical. However, the temperature should not approach the heat distortion temperature of the substrate, the flash temperature of the organic solvent, or the boiling point of the organic solvent. In the case where a UV light absorber is to be applied to the substrate by surface impregnation, the drying temperature and time must be sufficient to induce and complete migration of the UV light absorbing compound from the protective methyl methacrylic coating into the substrate. Commonly, drying times vary from about 10 minutes to 30 minutes and drying temperatures range from about 120° C. to about 130° C.

Thus has been described transparent, low glare, thermoplastic sheet having a textured thermoplastic substrate, preferably polycarbonate substrate, and a methyl methacrylic coating produced from a copolymer characterized by a glass transition temperature of greater than about 87° C. and an elongation at break (23° C., 50% RH) of greater than about 3.5%.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight. Examples 1-9 illustrate the improved weatherability of Applicants' methyl methacrylic protective coating.

EXAMPLE 1

Coating compositions having the following formulations were prepared by mixing the ingredients thoroughly.

|  | A | B* | C* |
|---|---|---|---|
| PMMA | 6.5[1] | 6.5[2] | 10[2] |
| Solvent | 90 | 90 | 70 |
| UV Absorber | 3.5 | 3.5 | 20 |

[1]ELVACITE 2021 resin, methyl methacrylate copolymer, DuPont Company: Elongation at Break (23° C., 50% RH) 4% and Glass Transition Temperature 100° C.
[2]ELVACITE 2008 resin, methyl methacrylate copolymer, DuPont Company: Elongation at Break (23° C., 50% RH), 0.5% and Glass Transition Temperature 105° C.
*Control

EXAMPLE 2

A 125 mil polycarbonate sheet of LEXAN 103 resin manufactured by General Electric Company was dip coated with composition A of Example 1 and dried to a coating thickness of 0.3 mil in an oven at 127° C. for 10 minutes. The resulting composite was clear and tack free with no substantial amounts of UV absorber in the methyl methacrylic protective coat.

EXAMPLE 3

A 125 mil polycarbonate sheet of LEXAN 103 resin was dip coated with composition B of Example 1 and dried to a coating thickness of 0.3 mil in an oven at 127° C. for 10 minutes. The resulting composite was as described in Example 2.

EXAMPLE 4

A 125 mil polycarbonate sheet of LEXAN 103 resin was curtain coated with composition C of Example 1 and dried to a coating thickness of 0.6 mil in an oven at 127° C. for 10 minutes. The resulting composite was as described in Example 2.

EXAMPLE 5

The composites of Example 2-4 were exposed in an accelerated UV exposure chamber manufactured by Atlas Electric Devices, Chicago, Ill., using 40 watt florescent UV lamps at an operating cycle of 8 Hours On/60° C./75% RH and 4 Hours Off/50° C./100% RH. The time to microcracking for each sample is shown below:

| HOURS | MICROCRACK | | |
|---|---|---|---|
|  | Example 2 | Example 3 | Example 4 |
| 0 | No | No | No |
| 300 | No | No | No |
| 600 | No | No | No |
| 900 | No | No | No |
| 1200 | No | No | Yes |
| 1500 | No | No | Yes |
| 1800 | No | Yes | Yes |
| 2100 | No | Yes | Yes |

EXAMPLE 6

Coating compositions having the following formulations were prepared by mixing the ingredients thoroughly.

|  | D | E* |
|---|---|---|
| PMMA[1] | 20 | — |
| PA[3] | — | ~20 |
| Solvent | 70 | ~75 |

|           | D  | E*  |
|-----------|-----|-----|
| UV Absorber | 10 | ~5 |

[1]ELVACITE 2021 resin, methyl methacrylate copolymer, DuPont Company: Elongation at break (23° C., 50% RH), 4% and Glass Transition Temperature 100° C.
[2]ethyl acrylate/butyl acrylate copolymer.
*control

EXAMPLE 7

A profiled polycarbonate sheet sold as THERMO-CLEAR profiled sheet by General Electric Company was dip coated with composition D of Example 6 and dried to a coating thickness of 0.3 mil in an oven at 127° C. for 5–10 minutes. The resulting composite was tack free with no substantial amounts of UV absorber in the methyl methacrylic protective coat.

EXAMPLE 8

A profiled polycarbonate sheet sold as THERMO-CLEAR profiled sheet was coated with composition E of Example 6 and dried to a coating thickness of 0.6 mil in an oven at 127° C. for 5–10 minutes. The resulting composite was clear and tack free with small amounts of UV absorber in the acrylate copolymer protective coat.

EXAMPLE 9

The composites of Examples 7 and 8 were placed under a 0.3% stress and exposed in an accelerated UV exposure chamber manufactured by Atlas Electric Devices, Chicago, Ill. using 40 watt florescent lamps at an operating cycle of 8 Hours ON/60° C./75% RH and 4 Hours OFF/50° C./100% RH. The time to microcrack for each sample is shown below:

|        | MICROCRACK |           |
|--------|-----------|-----------|
| HOURS  | Example 7 | Example 8 |
| 0      | No        | No        |
| 46     | No        | No        |
| 200    | No        | No        |
| 425    | No        | No        |
| 725    | No        | No        |
| 900    | No        | No        |
| 1175   | No        | Yes       |
| 1660   | No        | Yes       |
| 1900   | No        | Yes       |

Examples 10 and 11 are not within the scope of the present invention and illustrate the effects of weather upon surface texture where insufficient protection is provided by the protective coat.

EXAMPLE 10

Polycarbonate sheet manufactured from LEXAN 103 grade resin and having a thickness of 125 mils was horizontally exposed to the sun in Florida. Surface texture, as measured by haze, ASTM D-1003, was seen to deteriorate over time.

| MONTHS | HAZE, % |
|--------|---------|
| 0      | 2       |
| 12     | 11      |
| 24     | 19      |
| 36     | 30      |
| 48     | 28      |
| 60     | 49      |
| 72     | 55      |

EXAMPLE 11

Polycarbonate sheet manufactured from LEXAN 103 grade resin and having a thickness of 125 mils was curtain coated with composition C of Example 1 and dried to a coating thickness of 0.9 mil in an oven at 127° C. for 10 minutes. The coated side of the resulting composite was exposed to the sun in Florida. Surface texture, after a delay, was seen to deteriorate with time as shown below.

| MONTHS | HAZE, % | MICROCRACKING |
|--------|---------|---------------|
| 0      | 1       | No            |
| 12     | 2       | No            |
| 24     | 4       | Yes           |
| 36     | 3       | Yes           |
| 48     | 8       | Yes           |
| 60     | 15      | Yes           |
| 72     | 19      | Yes           |

Examples 12–15 illustrate the reduced distortion resulting from the use of finer texturing.

EXAMPLE 12

A LEXAN 103 grade polycarbonate resin film having a thickness of 10 mils was textured on one side with a 110 microinch RMS roller at 141° C.

EXAMPLE 13

A LEXAN 103 grade polycarbonate resin sheet having a thickness of 125 mils was textured on one side with a 95 microinch RMS roller at a temperature of 130° C.

EXAMPLE 14

A LEXAN 102 grade polycarbonate resin sheet having a thickness of 125 mils was textured on one side with a 103 microinch RMS roller at a temperature of 10° C. The sheet was dip coated with the coating composition A of Example 1 and dried to a coating thickness of 0.3 mil in an oven at 127° C. for 10 minutes. The resulting composite was clean and tack free with no substantial amounts of UV absorber in the methyl methacrylic protective coat.

EXAMPLE 15

The products of Examples 12–14 were compared for physical properties. Gloss was measured according to ASTM D523 on a GLOSSGUARD II meter from Pacific Scientific (white ceramic tile standard=41.0% at 60°).

|                                           | EXAMPLE 12 | EXAMPLE 13 | EXAMPLE 14 |
|-------------------------------------------|------------|------------|------------|
| Roller RMS                                | 110        | 95         | 10         |
| Gloss (60°), %                            | 7          | 37         | 132        |
| Distance at which 1/16" book type can be read, in. | 1/32 | ⅛ | 5½ |

What is claimed is:

1. A transparent, low glare, thermoplastic composite comprising:

(a) a transparent polycarbonate sheet having at least one textured surface with a roughness corresponding to that imprinted by the surface of a 5 to 65 microinch RMS finish roller at a temperature of from about 125° C. to about 145° C.; and,
(b) adhered to at least one textured surface of said sheet, a protective coating comprising a methyl methacrylic copolymer consisting essentially of:
  (i) methyl methacrylate units;
  (ii) from about ½ percent to about 10 percent by number of other methacrylate units selected from the group consisting of ethyl methacrylate, n-butyl methacrylate, i-butyl methacrylate, or mixtures thereof; and
  (iii) from about 0 percent to about 5 percent by number of other alpha-beta ethylenically unsaturated units;

wherein said units are combined in such ratio and polymerized to result in a copolymer material having a tensile elongation at break of greater than about 3.5 percent and a glass transition temperature of greater than about 87° C.

* * * * *